United States Patent Office 2,949,277
Patented Aug. 16, 1960

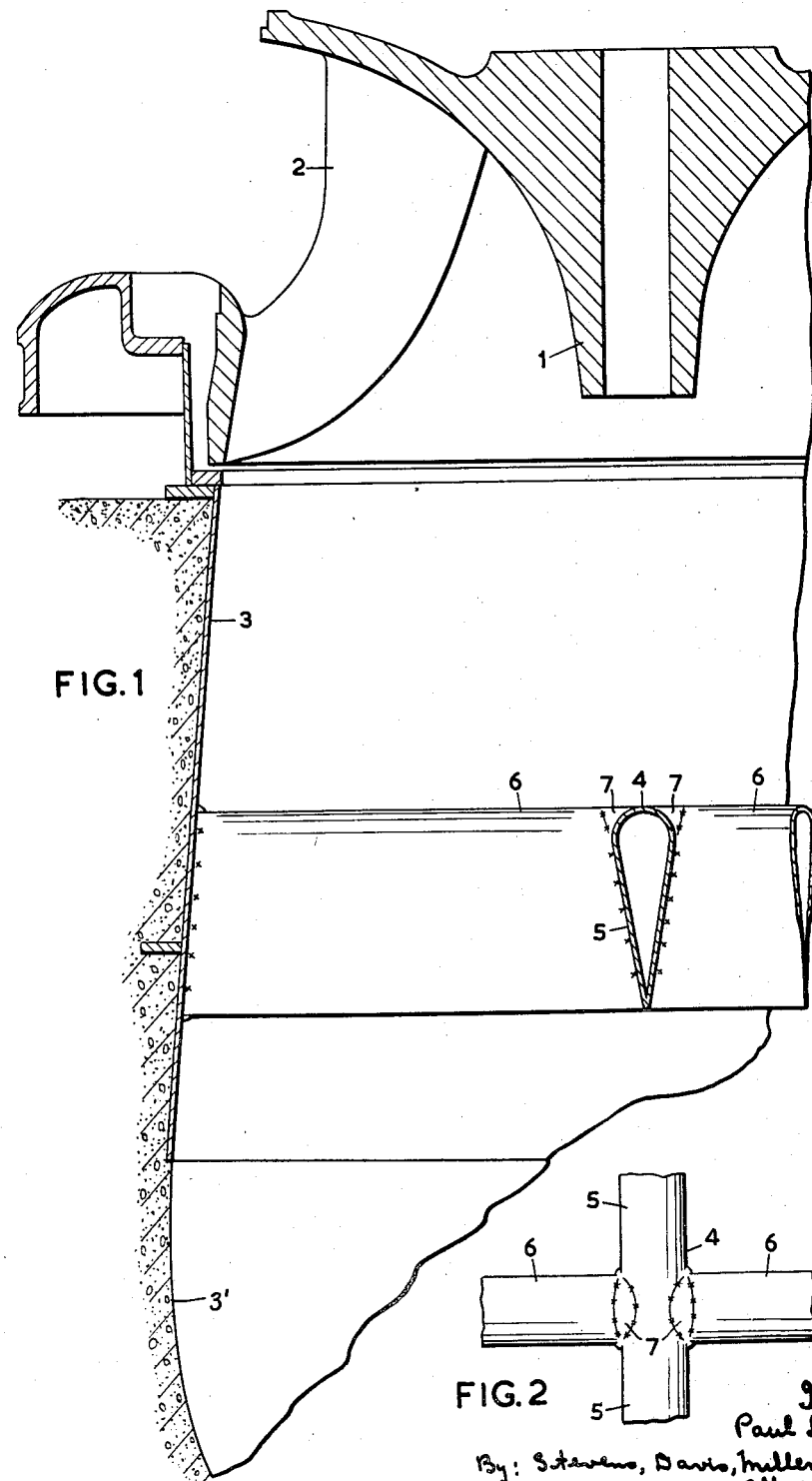

2,949,277

HYDRAULIC REACTION TURBINES

Paul Dériaz, Rugby, England, assignor to The English Electric Company Limited, London, England, a company of Great Britain Filed Sept. 16, 1957, Ser. No. 684,340

Claims priority, application Great Britain Sept. 28, 1956

3 Claims. (Cl. 253—22)

The invention relates to hydraulic reaction turbines having fixed runner vanes and operating at varying loads. Such turbines have the exit angles of their runner vanes so designed that at optimum working conditions the triangles of velocities composed of circumferential velocities and relative velocities have their resultant absolute velocities lying substantially in radial planes through the axis of rotation of the turbine runner.

However, under higher loads and particularly under lower loads than the design load these absolute velocities have of necessity circumferential components which result in vorticity in the draft tube of the turbine, which is particularly disadvantageous in the bend of the draft tube and in the following divergent portion thereof.

It has been proposed to arranged movable whirl deflecting vanes or guide vanes closely downstream of the turbine rotor. These vanes are either self-adjusting or form part of the speed governing mechanism, being then mechanically coupled to the wicket gates, upstream of the turbine runner.

It is a main object of the present invention to provide effective means for abolishing or at least substantially reducing vorticity in the draft tube of a hydraulic turbine, which dispense with movable or adjustable vanes and are consequently less expensive and less sensitive than movable vane mechanisms.

According to the present invention, the formation of vortices in the draft tube of a fixed vane hydraulic reaction turbine, particularly at part-loads, is abolished or at least substantially reduced by arranging a stationary spider having radial or diametrical arms in the draft tube, substantially half-way between the turbine runner and any bend in said draft tube, the profile of the said arms being pear-shaped, i.e. with the maximum thickness adjacent the leading edge and tapering towards the trailing edge. This has the advantage that regardless of the direction and magnitude of the circumferential components of the absolute exit velocities at varying loads, i.e. of the angle of incidence of the flow in the draft tube with respect to the profile of the said arms, a good stabilizing effect is attained, without the formation of secondary break-away eddies which might occur with thin leading edges of the said arms.

In order that the invention may be clearly understood and readily carried into effect, an embodiment thereof will now be described with reference to the accompanying drawing in which:

Fig. 1 is a longitudinal section of the runner and adjacent part of the draft tube of a Francis turbine according to the invention, Fig. 2 is a part plan view to Fig. 1.

The Francis turbine runner 1 has fixed vanes 2 discharging the water into the draft tube 3. A spider 4 consisting of hollow sheet metal arms 5, 6 is welded with the outer ends of said arms to the said draft tube at a station substantially midway between the turbine runner 1 and any bend 3' of the draft tube as usually occurring in vertical shaft turbines.

The arms 5, 6 have a pear-shaped profile, i.e. with the maximum thickness adjacent the leading edge and a sharp trailing edge closed by welding. As will be seen best from Fig. 2, the arms 5 form a single diametrical member, while the arms 6 are welded at their inner ends, preferably with the aid of fillets 7, to the central portion of said diametrical member 5.

However, spiders with more or less than four arms are also suitable, and the pear-shaped profiles of their arms may be attained by other means than bending sheet metal into hollow profiles, for example by casting.

What I claim as my invention and desire to secure by Letters Patent, is:

1. A hydraulic reaction turbine comprising in combination: a turbine runner having fixed runner vanes, a draft tube having a bend arranged downstream the said turbine runner, and a spider arranged stationarily in the draft tube substantially midway between the said turbine runner and the said bend in the draft tube, the said spider having arms extending across the draft tube and of a pear-shaped profile, i.e. with the maximum thickness adjacent the leading edge and tapering towards the trailing edge.

2. A hydraulic reaction turbine comprising in combination: a turbine runner having fixed runner vanes, a draft tube having a bend arranged downstream the said turbine runner, and a spider arranged stationarily in the draft tube substantially midway between the said turbine runner and the said bend in the draft tube, the said spider having hollow arms consisting of sheet metal bent to a pear-shaped profile, i.e. with the maximum thickness adjacent the leading edge and having a sharp trailing edge and a welding seam closing the said trailing edge, at least one of said arms extending transversely of the draft tube.

3. A hydraulic reaction turbine as claimed in claim 2, wherein one arm only of the said spider extends transversely of said draft tube, the other arms being welded at their inner ends to the central portion of said arm and extending radially from the welded attachment transversely of said draft tube.

References Cited in the file of this patent

UNITED STATES PATENTS

| 1,978,809 | Moody | Oct. 30, 1934 |
| 2,060,101 | Moody | Nov. 10, 1936 |
| 2,295,495 | Anderson | Sept. 8, 1942 |
| 2,300,748 | Rheingans | Nov. 3, 1942 |
| 2,861,737 | Bowen | Nov. 25, 1958 |

FOREIGN PATENTS

| 750,951 | Great Britain | June 20, 1956 |